(12) United States Patent
Fay (10) Patent No.: US 10,273,991 B2
(45) Date of Patent: Apr. 30, 2019

(54) MOUNTING CLIP AND RELATED METHODS

(71) Applicant: The Boeing Company, Chicago, IL (US)

(72) Inventor: Christopher W. Fay, Seattle, WA (US)

(73) Assignee: The Boeing Company, Chicago, IL (US)

( * ) Notice: Subject to any disclaimer, the term of this patent is extended or adjusted under 35 U.S.C. 154(b) by 490 days.

(21) Appl. No.: 14/991,839

(22) Filed: Jan. 8, 2016

(65) Prior Publication Data
US 2017/0198733 A1 Jul. 13, 2017

(51) Int. Cl.
B64C 1/06 (2006.01)
B64C 1/40 (2006.01)
F16B 2/22 (2006.01)

(52) U.S. Cl.
CPC .................. *F16B 2/22* (2013.01); *B64C 1/06* (2013.01); *B64C 1/403* (2013.01); *Y10T 24/155* (2015.01); *Y10T 29/49826* (2015.01); *Y10T 29/49863* (2015.01); *Y10T 29/49947* (2015.01)

(58) Field of Classification Search
CPC ..... B64C 1/06; B64C 1/403; Y10T 29/49826; Y10T 29/49863; Y10T 29/49947; Y10T 24/155; F16B 2/22
USPC ....... 248/229.26, 228.1, 228.4, 228.7, 228.8, 248/230.1, 230.4, 230.7, 230.8, 231.81; 29/446, 525.01, 42
See application file for complete search history.

(56) References Cited

U.S. PATENT DOCUMENTS

| | | | | |
|---|---|---|---|---|
| 3,228,640 | A * | 1/1966 | Wolsh | F16L 3/00 24/339 |
| 3,455,080 | A * | 7/1969 | Meadows | E06B 3/549 52/204.597 |
| 3,760,463 | A * | 9/1973 | Schneider | B65D 33/1625 24/30.5 S |
| 4,610,588 | A * | 9/1986 | Van Buren, Jr. | F16B 37/043 411/173 |
| 6,378,828 | B1 * | 4/2002 | Valiulis | A47F 5/0838 211/59.1 |
| 6,449,814 | B1 * | 9/2002 | Dinsmore | F16B 5/065 24/289 |
| 6,536,727 | B1 * | 3/2003 | Limber | F16B 2/22 248/227.1 |

(Continued)

OTHER PUBLICATIONS

"Click Bond Product Guide", Rev. 4, Aug. 10, 2010, 23 pages, Click Bond, Inc., Carson City, Nevada.

*Primary Examiner* — Sarang Afzali
*Assistant Examiner* — Darrell C Ford
(74) *Attorney, Agent, or Firm* — Haynes and Boone, LLP (57) ABSTRACT

A mounting clip may be provided that is configured to be secured to a stiffener and provide attachment of external components to the stiffener. In one example, the mounting clip includes a frame with a base and legs. Opposing engagement members extend from the legs. The opposing engagement members each include a pair of deformable flexures and a pad, which engages a surface of the stiffener. The stiffener may be inserted into a channel defined by engagement members and translated upwards, thus, translating the pads upward and inward. Subsequently, the pads and deformable flexures provide a compressive clamping stress on the stiffener and therefore permanently secure the mounting clip to the stiffener.

20 Claims, 12 Drawing Sheets

(56) References Cited

U.S. PATENT DOCUMENTS

| | | | | |
|---|---|---|---|---|
| 6,598,275 B1* | 7/2003 | Kolody | ............... | A61G 13/101 |
| | | | | 24/455 |
| 7,231,696 B2* | 6/2007 | Asano | ............... | B60R 13/0206 |
| | | | | 24/297 |
| 7,536,755 B2* | 5/2009 | Nakajima | ............... | F16B 5/065 |
| | | | | 24/297 |
| 7,621,486 B1* | 11/2009 | Barrepski | ............... | F16L 3/127 |
| | | | | 248/228.7 |
| 7,752,720 B2* | 7/2010 | Smith | ............... | B60N 2/5825 |
| | | | | 24/297 |
| 8,070,119 B2* | 12/2011 | Taylor | ............... | E04G 21/3261 |
| | | | | 248/237 |
| 8,079,561 B2* | 12/2011 | Jafari | ............... | H02G 3/126 |
| | | | | 174/50 |
| 8,621,793 B2* | 1/2014 | Abdul Lathief | ...... | E06B 3/5821 |
| | | | | 52/204.53 |
| 2005/0023421 A1 | 2/2005 | Wood et al. | | |
| 2008/0223391 A1* | 9/2008 | Baker | ............... | A45D 19/00 |
| | | | | 132/202 |
| 2009/0064471 A1* | 3/2009 | Santin | ............... | A47C 31/023 |
| | | | | 24/581.11 |
| 2012/0305724 A1* | 12/2012 | Diez Herrera | ......... | B60N 3/026 |
| | | | | 248/231.81 |
| 2012/0319448 A1* | 12/2012 | Mineta | ............... | B60N 2/5825 |
| | | | | 297/452.1 |
| 2013/0216771 A1* | 8/2013 | Fournie | ............... | B32B 3/04 |
| | | | | 428/122 |
| 2013/0340216 A1* | 12/2013 | Smith | ............... | F16B 2/22 |
| | | | | 24/564 |
| 2015/0184684 A1* | 7/2015 | Lathief | ............... | E06B 3/549 |
| | | | | 403/330 |

\* cited by examiner

MOUNTING CLIP AND RELATED METHODS

TECHNICAL FIELD

The present invention relates generally to assembly techniques and, more particularly, to the attachment of components to stiffeners structures.

BACKGROUND

Various types of clips and mounting methods are used to secure components to structures, such as stiffeners. Contemporary clips and methods are cumbersome and time-consuming. For example, installation often requires drilling through the structure and using fasteners to install the clip, or bracket, to the structure. Drilling through carbon composite structures made of, for example, carbon-fiber-reinforced polymer (CFRP) can present known difficulties and be expensive to drill.

Conventional solutions for installing mounting clips to structures, such as "I" beams, "ZEE" sections, or hat section panel stiffeners, are well-known. These solutions sometimes require engaging a flange of the structure. However, such solutions are not available for straight blade-type structures, owing to the lack of geometry for locking the clip to the structure. Therefore, clips are often attached to blade-style, free-web stiffeners by drilling holes and using through fasteners. An alternative to such approaches is the use of adhesively-installed standoffs and clips, which may not be preferred for permanent usage in some embodiments.

SUMMARY

In accordance with various embodiments further discussed herein, a self-securing mounting clip (also referred to as a "clip" or "bracket" herein) and methods of securing the clip are provided to securely couple the mounting clip to a structure. The clip may be mounted to architectural structures, such as buildings and bridges, or mobile structures, such as aerospace or maritime structures (e.g., aircrafts and ships). The clip may be used to secure installation, for example, wiring, insulation, and fluid systems, to the structure. For example, a series of the clips may be used to run wiring along the stiffeners of a fuselage of an aircraft.

The clip has a structural design that allows it to be secured to a stiffener without drilling through the clip or the stiffener and/or without using adhesives. The clip provides a compressive clamping force that increases if an applied force attempts to remove it from the stiffener. These and many other features may be provided in various combinations as desired and more fully discussed herein.

In one embodiment, a clip may be configured to attach to a stiffener of a structure. The clip may include a substantially U-shaped frame comprising a base and two legs extended therefrom and a pair of substantially opposed engagement members extended toward each other from the legs to define a channel that may receive the stiffener. The engagement members may clamp against the stiffener. Each engagement member may include a pad that contacts the stiffener and a deformable flexure having a first end coupled to one of the legs and a second end coupled to the pad. The flexures may deform in response to an insertion of the stiffener into the channel to translate the pad from a rest position to a clamped position.

In another embodiment, the flexures may translate each pad outward toward its corresponding attached leg in response to the insertion of the stiffener into the channel. The outward translation of the pads results in a compressive clamping stress applied by the pads against the stiffener. The flexures may also translate each pad toward the base in response to the insertion of the stiffener into the channel.

In one embodiment, a method includes: providing a stiffener of a structure; providing a clip able to attach to the stiffener; and securing the clip to the stiffener. The clip of this method includes a substantially U-shaped frame comprising a base and two legs extended therefrom, and a pair of substantially opposed engagement members extended toward each other from the legs to define a channel configured to receive the stiffener, wherein the engagement members are configured to clamp against the stiffener. Each engagement member includes a pad configured to contact the stiffener and a deformable flexure having a first end coupled to one of the legs and a second end coupled to the pad.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

In accordance with various embodiments provided herein, a mounting clip may be implemented to easily secure one or more external components to a structure such as a stiffener. In certain embodiments, the mounting clip may be implemented to provide secure components to the stiffener without sacrificing the integrity of the stiffener. In particular, the clip may permit rapid and secure installation of wiring, fluid systems, insulation, and/or similar external components to a free-web stiffener without the need to drill through the stiffener and/or clip or use fasteners to permanently secure the clip to the stiffener.

Referring now to the drawings, wherein the showings are for purposes of illustrating embodiments of the present invention only and not for purposes of limiting the same, FIGS. 1-5 illustrate various views of a mounting clip (also referred to herein as a "clip" or "bracket") in a rest position in accordance with an embodiment of the disclosure.

Figure 1:
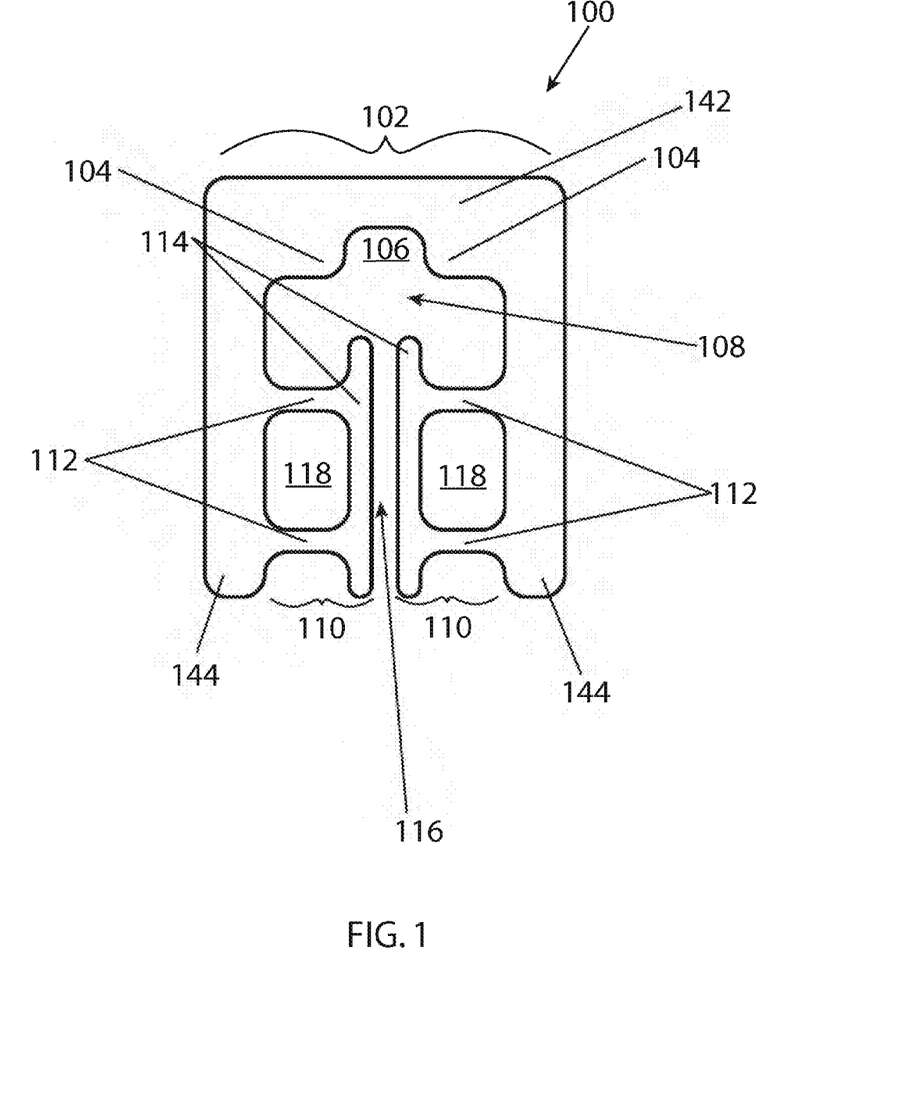
FIG. 1 illustrates a front elevational view of a mounting clip in a rest position in accordance with an embodiment of the disclosure.

FIG. 1 illustrates a front elevational view of a clip 100 in a rest position. For example, clip 100 may be implemented as a bracket capable of being secured to a stiffener of an aircraft fuselage and receiving components, such as wires, insulation, and/or fluid systems.

As shown, clip 100 includes a substantially U-shaped frame 102 (e.g., a monolithic frame), which includes a base 142, legs 144 extending therefrom, and substantially opposed engagement members 110.

In one or more embodiments, base 142 is substantially perpendicular to legs 144, which may be substantially parallel to each other. Engagement members 110 extend toward each other from legs 144 to define a channel 116. Each engagement member 110 includes deformable flexures 112 (also referred to as "flexures" herein) and a pad 114. FIG. 1 shows each engagement member with pair of flexures 112 for exemplary purposes; however, as understood by one skilled in the art, there may be fewer or more flexures 112 positioned between each leg 144 and pad 114.

In one or more embodiments, in the rest position, each pair of deformable flexures 112 are substantially perpendicular relative to their corresponding leg 144 and pad 114. Furthermore, each deformable flexure 112 of the pair is substantially parallel to the other.

In one or more embodiments, each of the flexures 112, the respective attached pad 114, and the respective attached leg 144 define an aperture 118. In one or more embodiments, in the rest position, apertures 118 may be substantially rectangular.

In one or more embodiments, base 142 may define a recess 106 that opens up into an interior opening 108 (e.g., a cavity), which is defined by frame 102. Recess 106 may receive a portion of a stiffener to prevent traverse translation and/or torsion of a stiffener in clip 100. In various embodiments, recess 106 may be implemented using various shapes that may receive and secure a portion, such as an edge, of a stiffener. For example, recess 106 may be rectangular, arcuate, triangular, or any other symmetrical or asymmetrical geometric shape.

Figure 2:
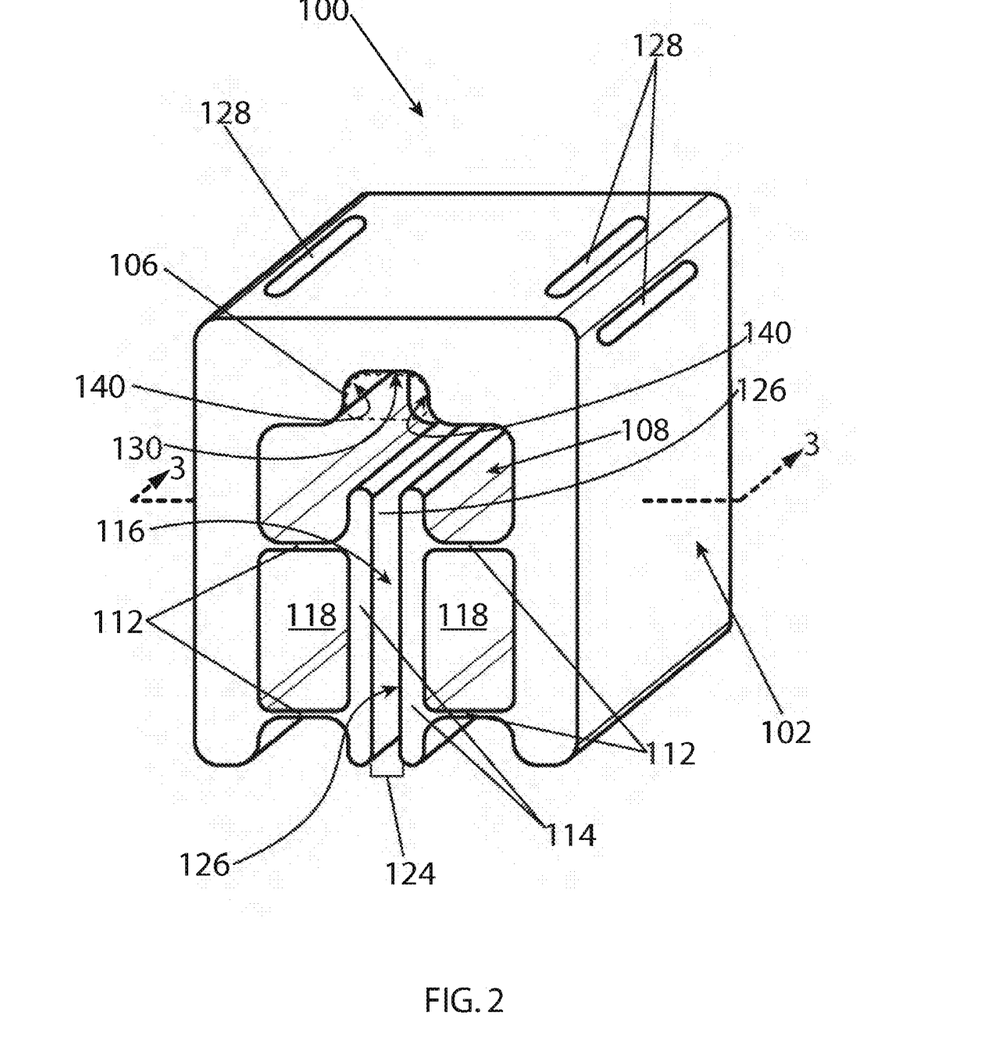
FIG. 2 illustrates a perspective view of the mounting clip in the rest position in accordance with an embodiment of the disclosure.

FIG. 2 illustrates a perspective view of clip 100 in the rest position. As shown, pads 114 each have engagement surfaces 126, which, in a clamped position, engage surfaces of a stiffener (see FIGS. 6 and 7). In one or more embodiments, engagement surfaces 126 are substantially planar. Engagement surfaces 126 may be substantially parallel to each other and define a channel 116, which opens at mouth 124 and terminates at interior opening 108. For example, a stiffener may be inserted into mouth 124 and traverse through channel 116. The stiffener may continue through channel 116 and into interior opening 108 until it reaches recess 106 and surfaces 130 and 140, which aid in securing clip 100 to the stiffener (see FIGS. 6 and 7). The engagement of a portion of the stiffener with recess 106 may prevent overturning and the possibility of loosening of clip 100 from the stiffener due to shock or vibration.

As will be further discussed herein, clip 100 includes bores such as bores 128, in frame 102 to secure external components to clip 100 and thus to the stiffener that the clip is attached thereto. For example, bores 128 may receive a fastener (e.g., a zip tie, wire, tubes, and/or or duct securing features) to secure an external component (e.g., wires and insulation) to clip 100.

Figure 3:
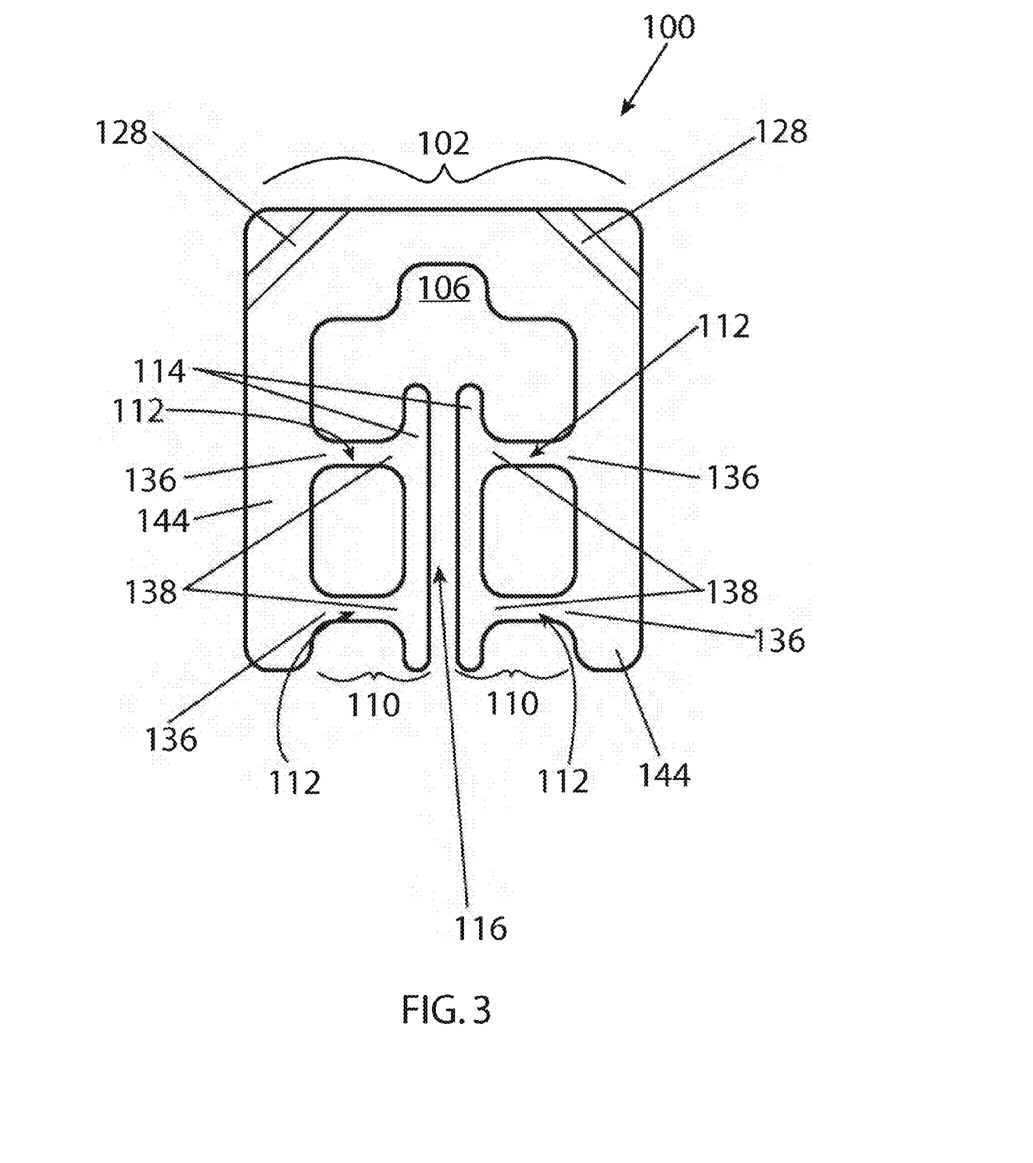
FIG. 3 illustrates a front elevational cross-sectional view of the mounting clip in the rest position along line 3-3 of FIG. 2 in accordance with an embodiment of the disclosure.

FIG. 3 illustrates a cross-sectional, front elevational view of clip 100 taken along line 3-3 of FIG. 2. In one or more embodiments, bores 128 may be located so that bore 128 traverses through frame 102, allowing a fastener to be threaded through frame 102.

As shown in FIG. 3, each deformable flexure 112 may have a first end 136 coupled to the corresponding leg 144 and a second end 138 coupled to the corresponding pad 114. As further discussed herein, in the rest position, first end 136 and second end 138 may be collinear. In the clamped position, first end 136 remains fixed relative to corresponding leg 144 and second end 138 coextends with corresponding pad 114. Second end 138 may translate with pad 114 outward toward leg 144 and toward base 142.

Figure 4:
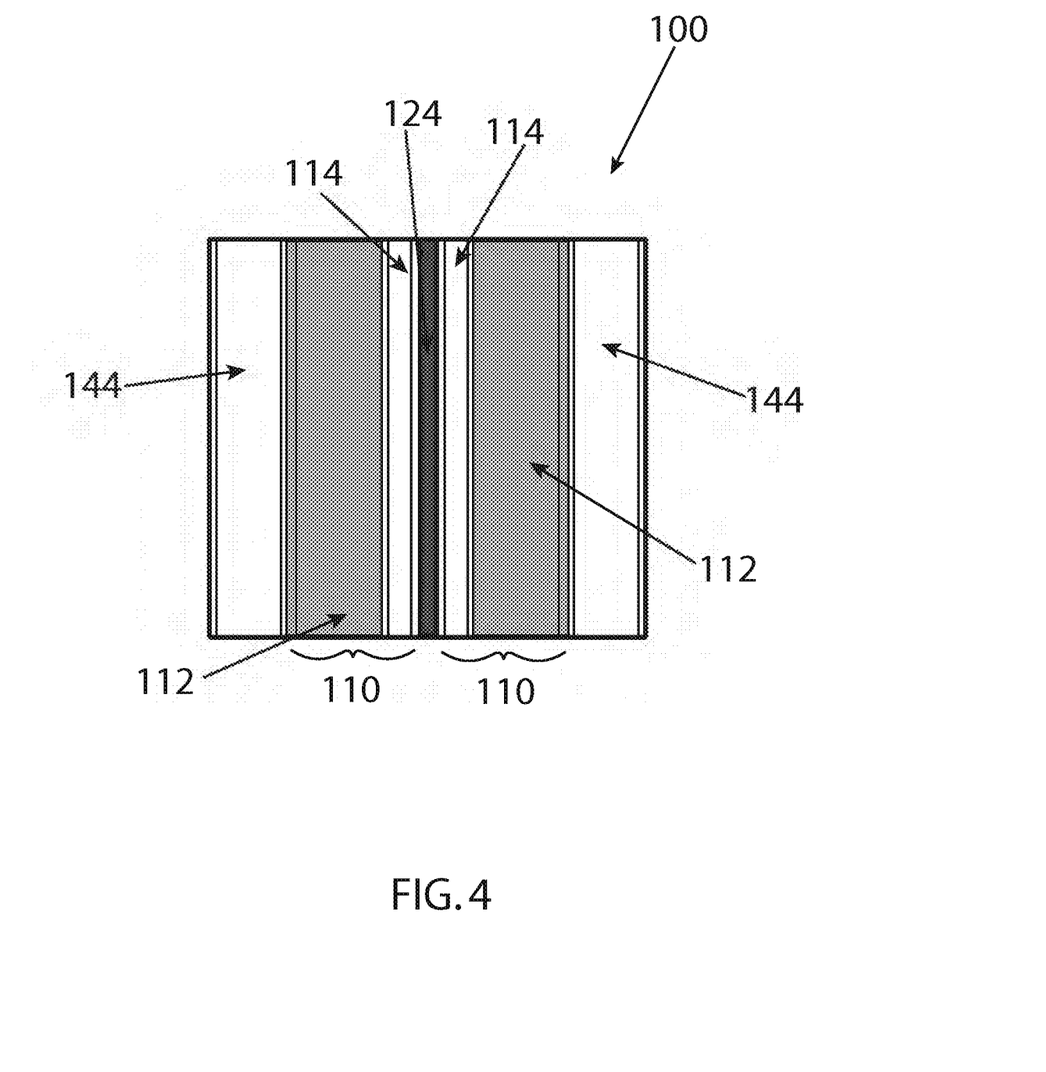
FIG. 4 illustrates a bottom view of the mounting clip in the rest position in accordance with an embodiment of the disclosure.
Figure 5:
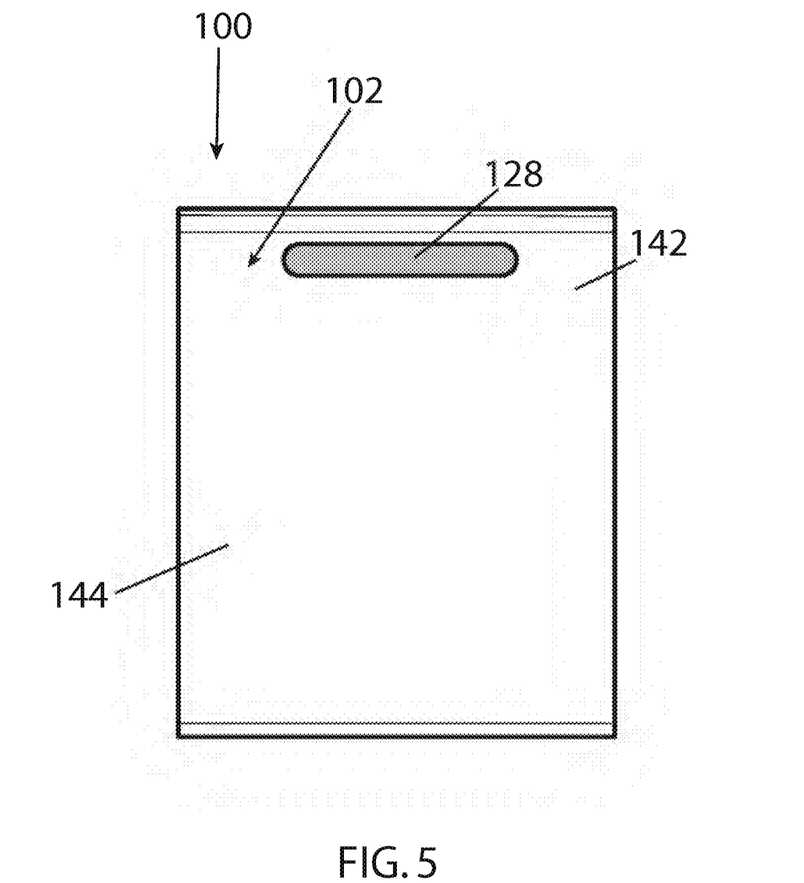
FIG. 5 illustrates a side view of the mounting clip in the rest position in accordance with an embodiment of the disclosure.

FIGS. 4 and 5 provide various views of clip 100 in the rest position in accordance with several embodiments of the invention. FIG. 4 shows a bottom view of clip 100 and FIG. 5 shows a right side view, which may be a mirror image of a left side view of clip 100.

Figure 6:
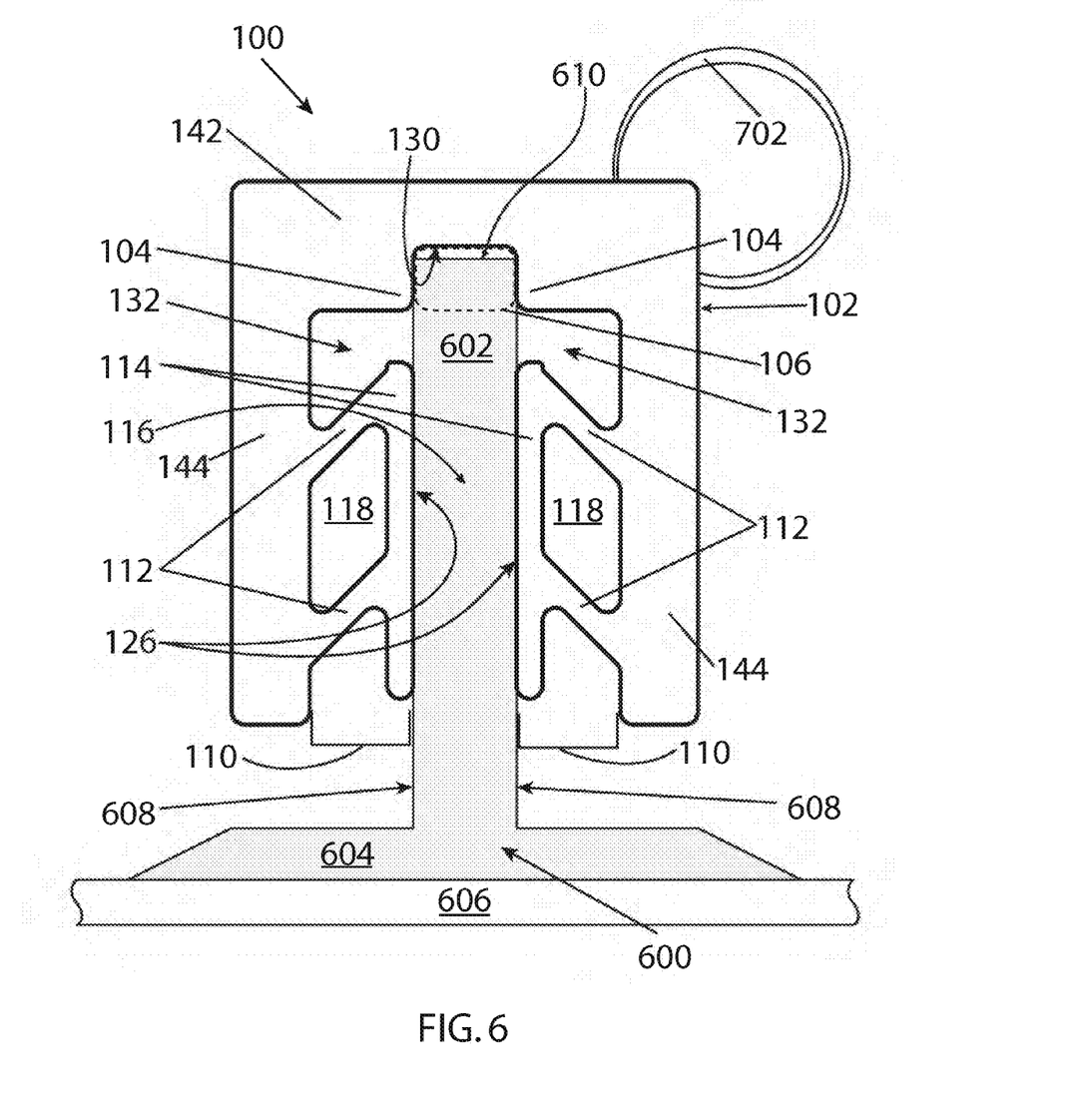
FIG. 6 illustrates a front view of the mounting clip in a clamped position in accordance with an embodiment of the disclosure.
Figure 7:
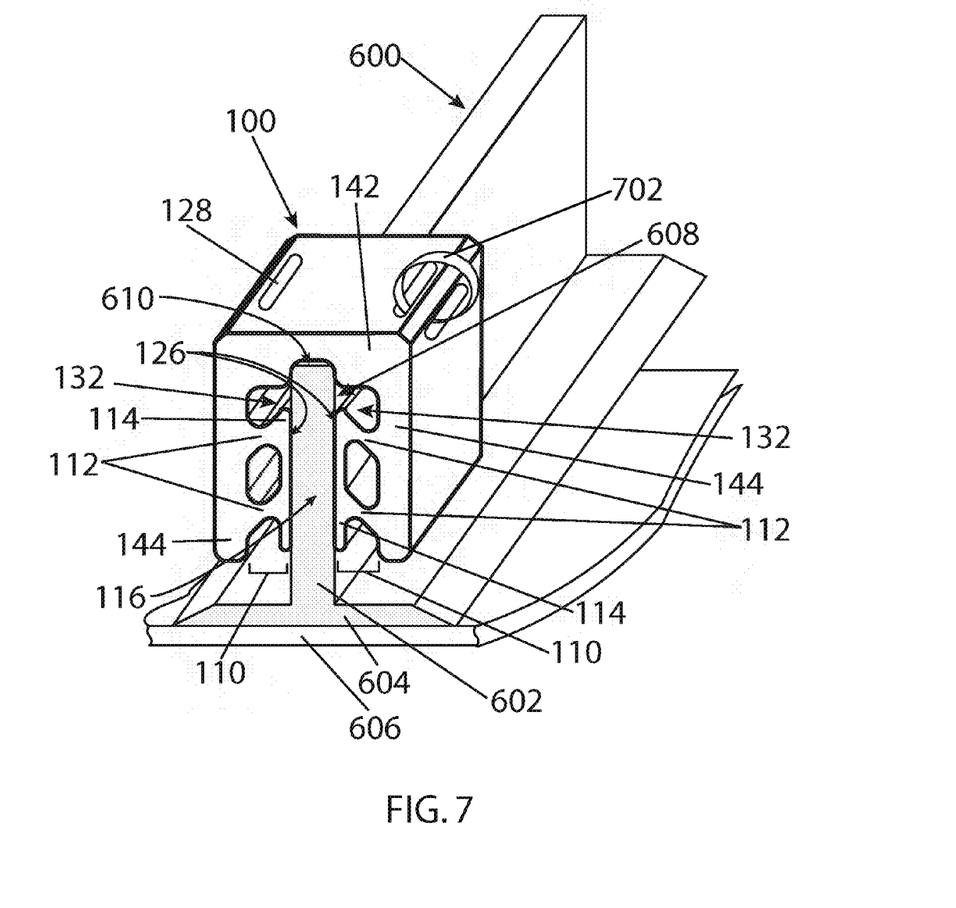
FIG. 7 illustrates a perspective view of the mounting clip in the clamped position in accordance with an embodiment of the disclosure.

Clip 100 may be in a rest position, as shown in FIGS. 1-5. However, clip 100 may also be in a clamped position, as shown in FIGS. 6 and 7. Specifically, clip 100 is in the clamped position when a stiffener is disposed within the channel and between the pads.

FIGS. 6 and 7 illustrate a front elevation view and a perspective view of clip 100, respectively, in the clamped position and secured to a stiffener 600. Stiffener 600 may be, for example, a free-edge stiffener such as a flat bar, a "TEE", an angle, an inverted channel, an "I", a rectangular tube, a hull stiffening channel, fillet-welded plates, or any other type of stiffener with an accessible web or flange. In the example shown in FIGS. 6 and 7, stiffener 600 is an inverted "TEE" stiffener with a blade 602 (e.g., a web or panel) and a base 604 (e.g., a flange). Base 604 may be coupled to a skin 606 of a structure such as, for example, the fuselage of an aircraft. As understood by one skilled in the art, clip 100 is not limited to use on stiffeners alone and may also be mounted to any other panel-like structure, such as, for example, a beam. In one or more embodiments, clip 100 may be used in conjunction with adhesive binding to further secure clip 100 to stiffener 600.

In one or more embodiments, stiffener 600 may be received by clip 100 by interposing blade 602 between opposing engagement members 110. Each engagement surface 126 of corresponding pad 114 engages a sidewall 608 of blade 602.

Flexures 112 act as springs and deform in response to an insertion of stiffener 600 into channel 116, resulting in clip 100 translating from a rest position to a clamped position, which is shown in FIGS. 6 and 7. For example, during deformation of flexures 112, second ends 138 may coextend toward base 142 along with corresponding pads 114 while first ends 136 remain substantially fixed relative to leg 144. Simultaneously, flexures 112 may translate each pad 114 outward toward its corresponding attached leg 144 in response to the insertion of stiffener 600 into channel 116. The translations of pads 114 result in a compressive clamping stress and friction fit caused by engagement members 110 on sidewalls 608 of stiffener 600. The compressive clamping stress prevents blade 602 from reversely translating back through channel 116 to remove clip 100 from stiffener 600, thus coupling clip 100 to stiffener 600. For example, in some embodiments, deformable flexures 112 provide positive strain energy that results in pads 114 griping blade 602 and therefore resisting pull-off by using friction.

In the clamped position, flexures 112 of each engagement member 110 are disposed at acute angles relative to corresponding leg 144. For example, as shown in the clamped position of FIGS. 6 and 7, apertures 118 may become parallelogrammatic with unequal polygon diagonals.

In one or more embodiments, blade 602 may be inserted into clip 100 until mating surface 610 of blade 602 is engaged with mating surface 130 of recess 106. Base 142 may have shoulders 104 that partially define recess 106 and may be used to provide abutment surfaces 140 (see FIG. 2) that engage portions of sidewalls 608 to prevent traverse translation and/or torsion of blade 602 in clip 100.

In one or more embodiments, a fastener 702 may be threaded through bore 128. For example, fastener 702, which may be, for example, a zip tie, may be secured to frame 102 of clip 100 via bore 128. Fastener 702 may then be used to attach external components, as discussed further herein, to clip 100. Furthermore, the insertion of blade 602 through channel 116 may separate interior opening 108 into two openings 132. Fastener 702 may be threaded through openings 132 to also secure external components to clip 100.

Figure 8:
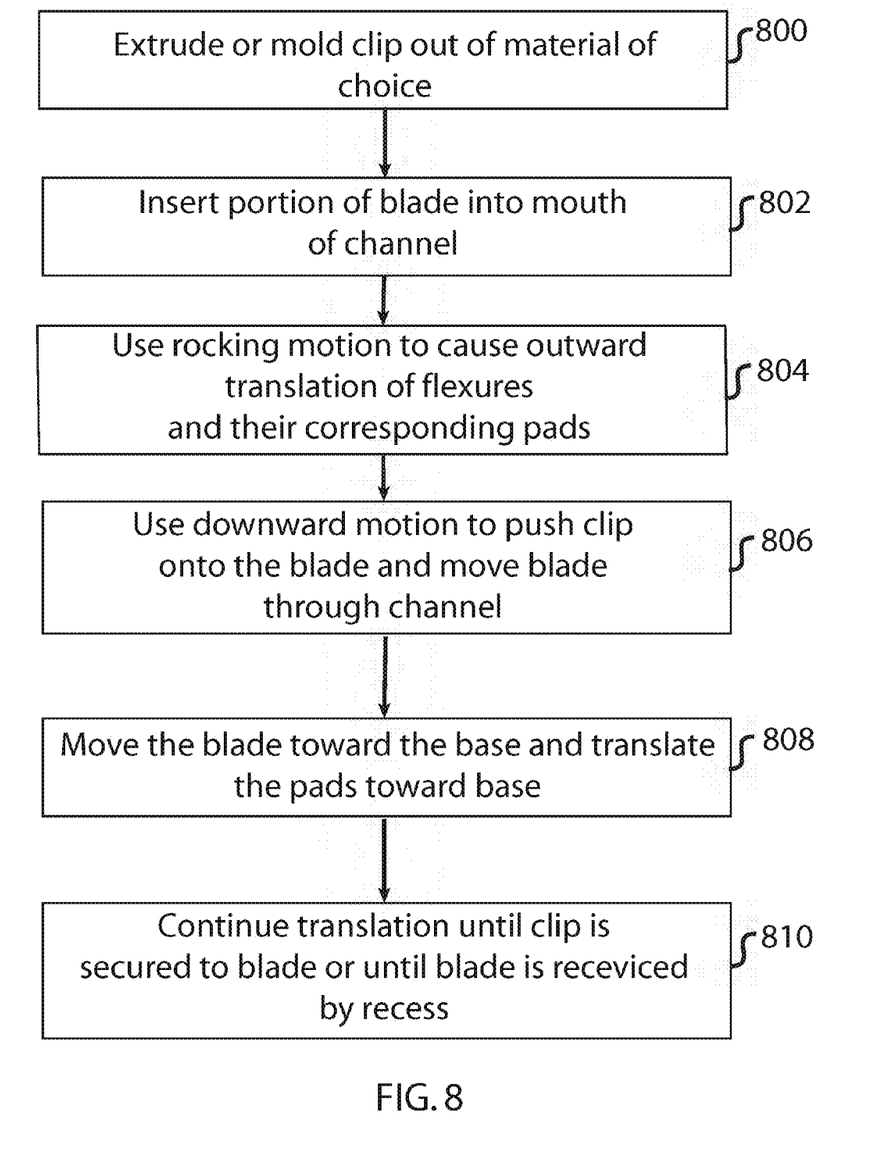
FIG. 8 illustrates a process to manufacture and secure a mounting clip to a stiffener in accordance with an embodiment of the disclosure.

Having described the overall structural features of clip 100 above, the overall operation of clip 100 will be further discussed with regard to FIG. 8, which illustrates a process an installer may use to manufacture and secure clip 100 to a stiffener and in accordance with an embodiment of the disclosure.

In block 800, clip 100 is extruded or molded out of a desired material. For example, clip 100 may be molded from a rubber-like material or polymer material such as ULTEM® or amorphous thermoplastic polyetherimide (PEI) resins, Nylon 6-6, flame-resistant Nylon or medium to high durometer elastomers, or any other material that has a good tensile and compressive strength and moderate Young's modulus elongation. The chosen material may provide enough stiffness for frame 102 to remain rigid and resist rotation of the stiffener when in the clamped position. Furthermore, stiffness at base 142 of frame 102 aid when the clip is pulled. In this regard, the stiffness drives the load from flexures 112 to pads 114 and thus into blade 602.

In block 802, a portion of blade 602 is inserted into mouth 124 of channel 116 by an installer. For example, blade 602 may be inserted into mouth 124 at an angle by biasing one pad 114 against sidewall 608. A rocking motion may then be used by the installer to cause outward translation of flexures 112 and their corresponding pads 114, as shown in block 804.

Figure 9:
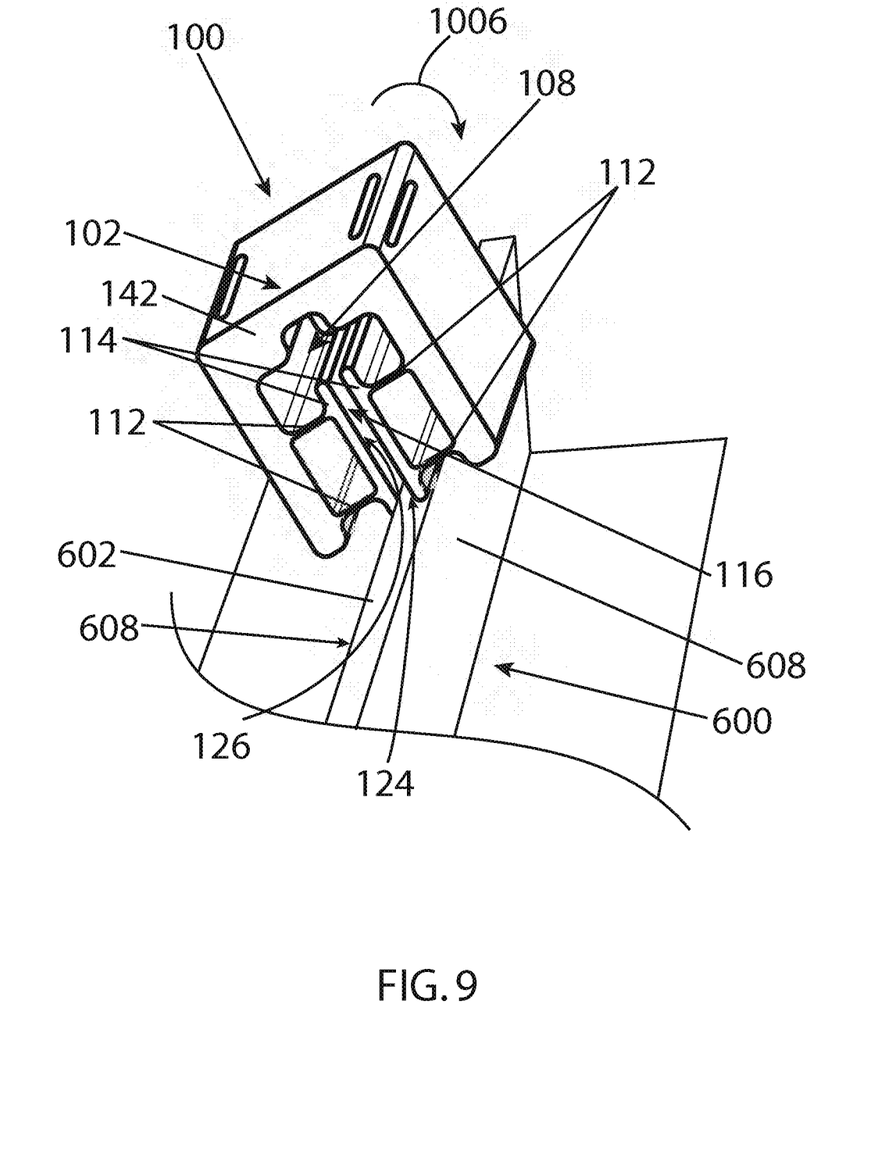
FIG. 9 illustrates a perspective view of a mounting clip prior to being secured to a stiffener in accordance with an embodiment of the disclosure.

FIG. 9 illustrates a perspective view of mounting clip 100 prior to being secured to stiffener 600 (block 802). Blade 602 has a wider width than channel 116 of clip 100 in the rest position, as shown. Engagement surface 126 may be biased against sidewall 608 at an angle. As indicated by directional arrow 1006, clip 100 may then be rocked to part mouth 124 and accept blade 602 into channel 116. By the rocking motion and downward motion (block 806), stiffener 600 may traverse channel 116, which has an increased width in the clamped position, toward base 142 of clip 100.

In block 806, the installer may then use an applied force, such as a downward motion, to push clip 100 onto blade 602 and thus move blade 602 though channel 116. Subsequently, as shown in block 808, blade 602 moves toward base 142, flexures 112 will deform, and thus pads 114 will move outward toward their corresponding legs 144.

Figure 10:
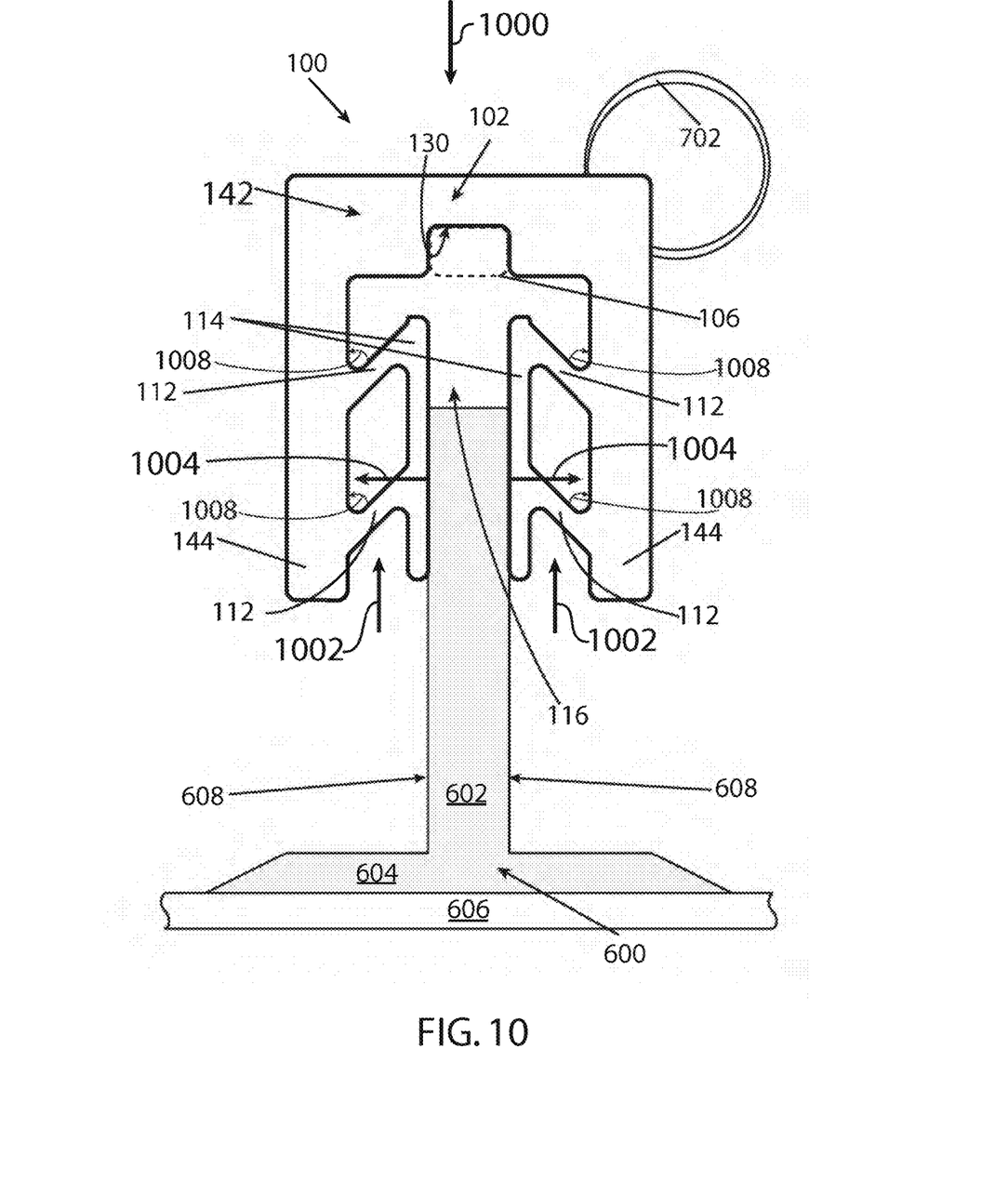
FIG. 10 illustrates a front elevational view of a mounting clip partially secured to a stiffener in accordance with an embodiment of the disclosure.

FIG. 10 illustrates a front elevational view of clip 100 partially secured to stiffener 600, where clip 100 is proceeding from a rest position to a clamped position. For example, a force (e.g., a downward force, as indicated by directional arrow 1000, applied by an installer on clip 100) allows stiffener blade 602 to traverse through channel 116 toward base 142. As a result, flexures 112 deform and pads 114 move outward toward their corresponding leg 144, as indicated by directional arrows 1004. The insertion of blade 602 into channel 116 also results in pads 114 moving toward base 142, as shown by directional arrows 1002. The deforming of flexures 112 disposes flexures 112 of each engagement member 110 at acute angles (e.g., angles 1008) relative to their corresponding leg 144.

In block 810, the translation of blade 602 through clip 100 is continued until clip 100 is secured or until blade 602 is received by recess 106, as previously discussed herein.

FIG. 9 in combination with FIG. 10 illustrates the securing of clip 100 to stiffener 600 as described by the process of FIG. 8.

In one or more embodiments, once clip 100 is completely secured to blade 602 and in the clamped position, each pad 114 provides a compressive clamping stress on either sidewall 608. If an opposing force opposite of directional arrow 1000 is imposed on clip 100, flexures 112 provide increased resistive forces opposite of directional arrows 1004 and 1002. The pulling of clip 100 results in the stiffness of frame 102 driving the load from flexures 112 to pads 114 and therefore an increase in a normal and frictional force exerted by pads 114 and applied to sidewalls 608 of blade 602, thus, increasing the clamping force on stiffener 600.

Figure 11:
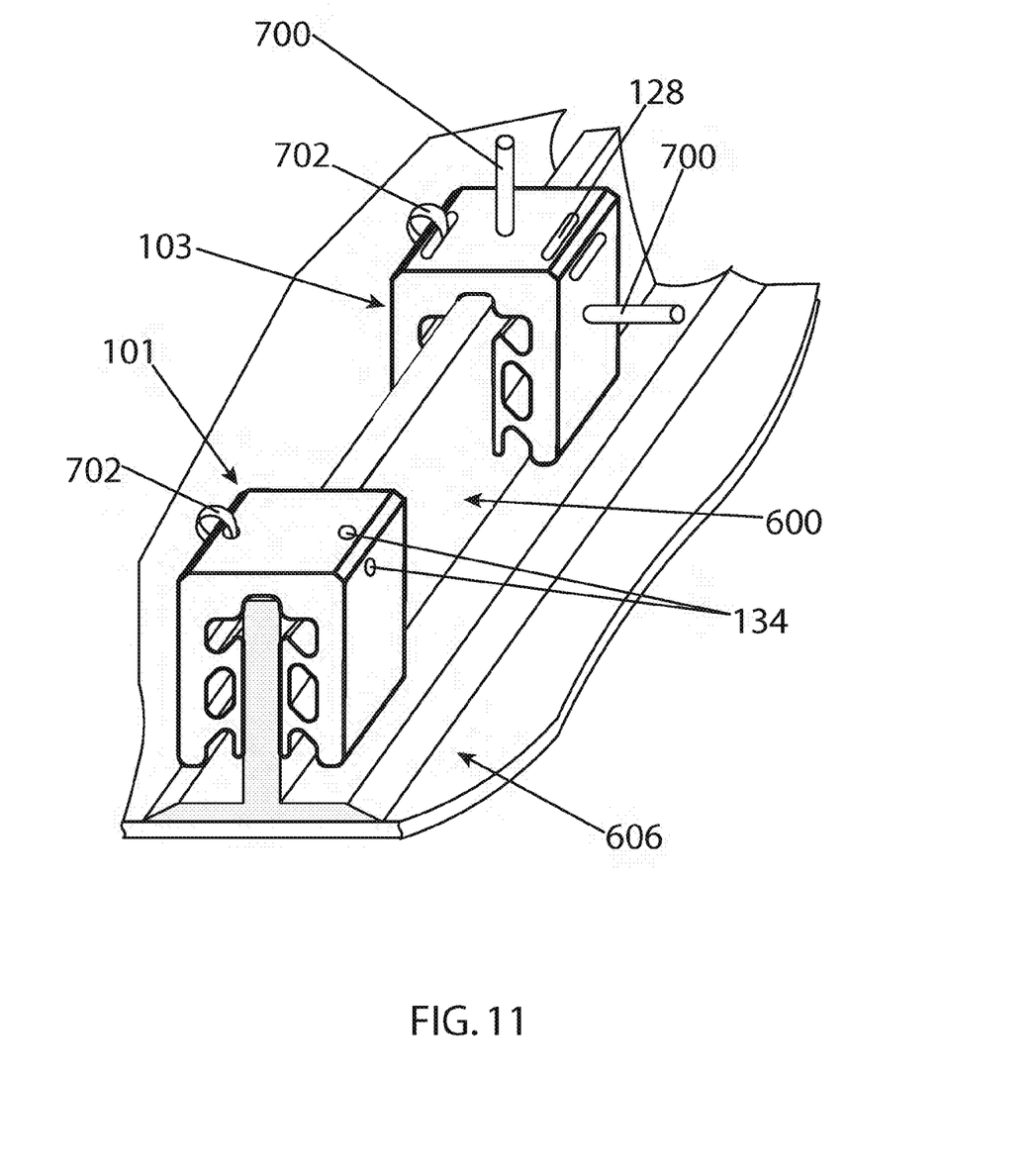
FIG. 11 illustrates two mounting clips in the clamped position in accordance with an embodiment of the disclosure.

FIG. 11 illustrates two clips 101 and 103 having other configurations and secured to stiffener 600. Clip 101 may have bores 134 that may receive fasteners 702. Clip 103 may have mounting components 700 that may receive fasteners to attach external components. External components may be mounted onto clips 100, 101, and 103 individually or numerous clips may share the same attached external component.

Figure 12:
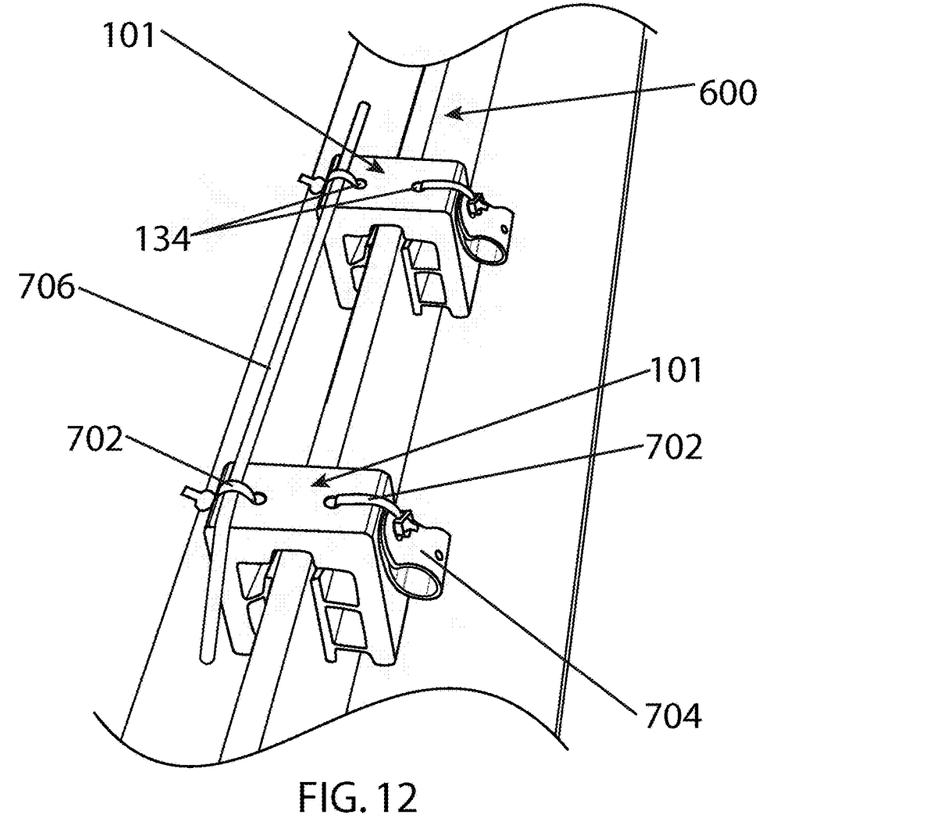
FIG. 12 illustrates two mounting clips in the clamped position with components secured to the clips in accordance with an embodiment of the disclosure.
Figure 13:
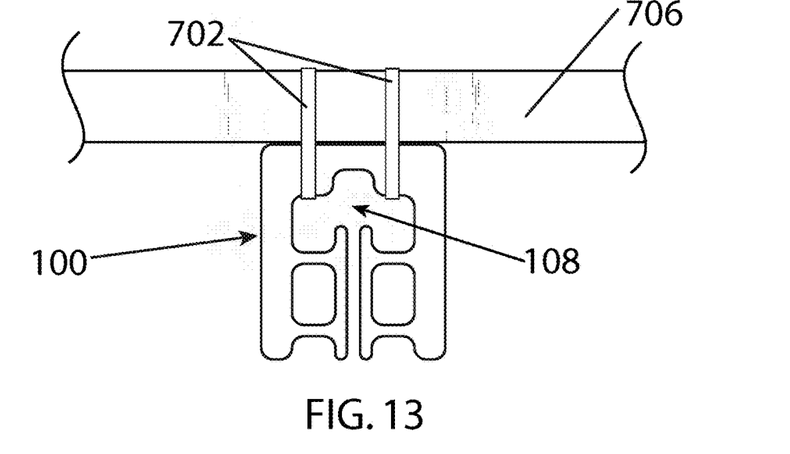
FIG. 13 illustrates a mounting clip in the rest position with a component secured to the clip in accordance with an embodiment of the disclosure.

FIGS. 12 and 13 show various mountings for external components. For example, as shown in FIG. 12, fasteners 702 (e.g., zip ties, wires, etc.) are used to attach an external component 706 (e.g., a wire) to the series of clips 101. Clip 100 may also have varying sized bores. For example, clip 101 may have a bore 134, which is circular rather than an elongated bore (e.g. bore 128). Bores 134 may receive fasteners 702, which may attach to other securing components, such as a sling 704. Furthermore, as shown in FIG. 13, fasteners 702 may also be secured to clip 100 by various other locations, such as interior opening 108 and/or openings 132.

The disclosure is not intended to limit the present invention to the precise forms or particular fields of use disclosed. It is contemplated that various alternate embodiments and/or modifications to the present invention, whether explicitly described or implied herein, are possible in the mounting clip of the disclosure. For example, it is contemplated that the various embodiments set forth herein may be combined together and/or separated into additional embodiments where appropriate.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the scope of the invention is defined only by the following claims.

What is claimed is:

1. A clip configured to attach to a stiffener of a structure, the clip comprising:
    a substantially U-shaped frame comprising a base and two legs extended therefrom;
    a pair of substantially opposed engagement members extended toward each other from the legs to define a channel configured to receive the stiffener, wherein the engagement members are configured to clamp against corresponding sidewalls of the stiffener to secure the clip to the stiffener, wherein each engagement member comprises:
        a pad comprising a substantially planar engagement surface configured to contact and frictionally secure to the corresponding sidewall of the stiffener,
        a first deformable flexure having a first end coupled to one of the legs and a second end coupled to the pad, and
        a second deformable flexure having a first end coupled to the one of the legs and a second end coupled to the pad; and
    wherein the flexures are configured to deform in response to an insertion of the stiffener into the channel to translate the pad from a rest position to a clamped position, wherein the flexures remain deformed while the clip is secured to the stiffener.

2. The clip of claim 1, wherein the flexures are configured to translate the pads outward toward the legs in response to the insertion of the stiffener into the channel, wherein the outward translation of the pads results in a compressive clamping stress applied by the pads against the stiffener.

3. The clip of claim 1, wherein the flexures are configured to translate the pads toward the base in response to the insertion of the stiffener into the channel.

4. The clip of claim 1, wherein each engagement member comprises two of the flexures.

5. The clip of claim 4, wherein:
    the flexures are substantially perpendicular relative to the legs in the rest position; and
    the flexures are disposed at acute angles relative to the legs in the clamped position.

6. The clip of claim 1, wherein the engagement surfaces are substantially parallel with each other in the rest position.

7. The clip of claim 1, wherein:
    the legs are substantially parallel; and
    the base is substantially perpendicular to longitudinal axes of the legs to provide the substantially U-shaped frame.

8. The clip of claim 1, wherein the base defines a recess configured to receive an end of the stiffener inserted through the channel inserted to reduce traverse translation and/or torsion of the clip relative to the stiffener.

9. The clip of claim 1, wherein the frame comprises a bore configured to receive a fastener to secure an external component to the clip.

10. The clip of claim 1, wherein the frame comprises a polymer material.

11. A method comprising:
    providing a clip configured to attach to a stiffener of a structure, the clip comprising:
        a substantially U-shaped frame comprising a base and two legs extended therefrom;
        a pair of substantially opposed engagement members extended toward each other from the legs to define a channel configured to receive the stiffener, wherein the engagement members are configured to clamp against corresponding sidewalls of the stiffener to secure the clip to the stiffener, wherein each engagement member comprises:
            a pad comprising a substantially planar engagement surface configured to contact and frictionally secure to the corresponding sidewall of the stiffener,
            a first deformable flexure having a first end coupled to one of the legs and a second end coupled to the pad, and
            a second deformable flexure having a first end coupled to the one of the legs and a second end coupled to the pad; and
    securing the clip to the stiffener, wherein the flexures are configured to deform in response to an insertion of the stiffener into the channel to translate the pad from a rest position to a clamped position, wherein the flexures remain deformed while the clip is secured to the stiffener.

12. The method of claim 11, further comprising:
    translating the pads outward toward the legs via the flexures in response to the insertion of the stiffener into the channel; and
    wherein the outward translation of the pads results in a compressive clamping stress applied by the pads against the stiffener.

13. The method of claim 11, further comprising:
    translating the pads toward the base via the flexures in response to the insertion of the stiffener into the channel.

14. The method of claim 11, wherein each engagement member comprises two of the flexures.

15. The method of claim 14, wherein:
    the flexures are substantially perpendicular relative to the legs in the rest position; and
    the flexures are disposed at acute angles relative to the legs in the clamped position.

16. The method of claim 11, wherein
    the engagement surfaces are substantially parallel with each other in the rest position.

17. The method of claim 11, wherein:
    the legs are substantially parallel; and
    the base is substantially perpendicular to longitudinal axes of the legs to provide the substantially U-shaped frame.

18. The method of claim 11, wherein the base defines a recess configured to receive an end of the stiffener inserted through the channel inserted to reduce traverse translation and/or torsion of the clip relative to the stiffener.

19. The method of claim 11, wherein the frame comprises a bore configured to receive a fastener to secure an external component to the clip.

20. The method of claim 11, wherein the frame comprises a polymer material.

* * * * *